US010645144B2

United States Patent
Haizmann et al.

(10) Patent No.: US 10,645,144 B2
(45) Date of Patent: May 5, 2020

(54) COMPUTER-IMPLEMENTED METHOD FOR CONTROLLING A REMOTE DEVICE WITH A LOCAL DEVICE

(71) Applicant: TeamViewer GmbH, Göppingen (DE)

(72) Inventors: Andreas Haizmann, Schlierbach (DE); Sascha Rau, Göppingen (DE); Tobias Lau, Ulm (DE)

(73) Assignee: TeamViewer GmbH, Göppingen (DE)

( * ) Notice: Subject to any disclaimer, the term of this patent is extended or adjusted under 35 U.S.C. 154(b) by 260 days.

(21) Appl. No.: 15/795,559

(22) Filed: Oct. 27, 2017

(65) Prior Publication Data

US 2018/0124151 A1    May 3, 2018

(30) Foreign Application Priority Data

Oct. 28, 2016 (EP) ..................... 16196421

(51) Int. Cl.
*H04L 29/08* (2006.01)
*G06F 3/14* (2006.01)
(Continued)

(52) U.S. Cl.
CPC .......... *H04L 67/025* (2013.01); *G06F 3/0485* (2013.01); *G06F 3/0488* (2013.01); *G06F 3/1454* (2013.01); *G06T 3/0006* (2013.01); *G06F 2203/04806* (2013.01); *G06F 2209/545* (2013.01)

(58) Field of Classification Search
CPC ... H04L 67/025; G06T 3/0006; G06F 3/0488; G06F 3/0485; G06F 2203/04806; G06F 2209/545; G06F 3/1454
See application file for complete search history.

(56) References Cited

U.S. PATENT DOCUMENTS

| 7,870,496 B1 | 1/2011 | Sherwani |
| 8,832,548 B2 * | 9/2014 | Duga ................... G06F 3/0481 715/235 |

(Continued)

OTHER PUBLICATIONS

Search Report dated Apr. 25, 2017, European Search Report in corresponding European Application 16196421.8, dated Oct. 28, 2017; 9 pages.

(Continued)

*Primary Examiner* — Amy M Levy
(74) *Attorney, Agent, or Firm* — Lempia Summerfield Katz LLC

(57) ABSTRACT

A computer-implemented method is presented for controlling a remote device with a local device which may have a smaller screen than the remote device. At least a part of a content of a screen of the remote device is displayed on a screen of the local device with a magnification m. The local device records a user-action performed on the local device, for example a swipe or pan gesture. If the value of the magnification m is greater than a threshold value M, the local device interprets the user-action as a command destined for itself and executes the command. If the value of the magnification m is equal to or smaller than the threshold value M, the local device interprets the user-action as a command destined for the remote device and transmits the command to the remote device for execution on the remote device.

8 Claims, 8 Drawing Sheets

(51) Int. Cl.
*G06F 3/0485* (2013.01)
*G06F 3/0488* (2013.01)
*G06T 3/00* (2006.01)

(56) References Cited

U.S. PATENT DOCUMENTS

| | | | | |
|---|---|---|---|---|
| 9,635,091 B1* | 4/2017 | Laukkanen | ............ | H04L 67/025 |
| 2003/0095135 A1* | 5/2003 | Kaasila | ................. | G06F 3/0481 |
| | | | | 345/613 |
| 2004/0183817 A1* | 9/2004 | Kaasila | ............... | G06F 16/9577 |
| | | | | 345/660 |
| 2010/0070915 A1* | 3/2010 | Tsutsui | .................. | G06F 3/0488 |
| | | | | 715/800 |
| 2010/0077431 A1* | 3/2010 | Neufeld | ................. | G06F 3/0488 |
| | | | | 725/39 |
| 2010/0268762 A1 | 10/2010 | Pahlavan et al. | | |
| 2010/0269039 A1* | 10/2010 | Pahlavan | .............. | G06F 3/0481 |
| | | | | 715/702 |
| 2012/0075204 A1* | 3/2012 | Murray | ................. | G06F 3/0416 |
| | | | | 345/173 |
| 2013/0311941 A1* | 11/2013 | Fields | ................. | G06F 3/04883 |
| | | | | 715/800 |
| 2013/0328938 A1* | 12/2013 | Yamaguchi | ......... | G06F 3/04883 |
| | | | | 345/660 |
| 2014/0313329 A1* | 10/2014 | Julien | .................... | H04N 7/183 |
| | | | | 348/143 |
| 2014/0325530 A1* | 10/2014 | Lu | ........................... | G06F 9/542 |
| | | | | 719/318 |
| 2014/0344766 A1* | 11/2014 | Cao | ........................ | G06F 3/017 |
| | | | | 715/863 |
| 2014/0361982 A1* | 12/2014 | Shaffer | ................... | G06F 3/017 |
| | | | | 345/156 |
| 2015/0020025 A1* | 1/2015 | Fish | ........................ | G06F 3/147 |
| | | | | 715/802 |
| 2015/0026586 A1* | 1/2015 | Nylund | .................. | G06F 3/0488 |
| | | | | 715/740 |
| 2015/0033183 A1* | 1/2015 | Voorhees | .............. | G06F 3/0481 |
| | | | | 715/801 |
| 2015/0067035 A1* | 3/2015 | Sullad | ..................... | H04L 67/08 |
| | | | | 709/203 |
| 2015/0163369 A1* | 6/2015 | Komaba | ........... | H04N 1/00469 |
| | | | | 358/1.15 |
| 2015/0172361 A1* | 6/2015 | Vetter | ................... | H04L 67/025 |
| | | | | 715/740 |
| 2015/0220232 A1* | 8/2015 | Smith | ................... | G06F 3/0484 |
| | | | | 715/784 |
| 2015/0334162 A1* | 11/2015 | Krishnamurthy | ..... | H04L 67/025 |
| | | | | 715/740 |
| 2016/0050255 A1* | 2/2016 | Hyyrynen | ............. | G06F 3/0482 |
| | | | | 715/740 |
| 2016/0378291 A1* | 12/2016 | Pokrzywka | ......... | G06F 3/04842 |
| | | | | 715/751 |
| 2017/0192737 A1* | 7/2017 | Mabey | .................. | G06F 3/0483 |
| 2018/0005454 A1* | 1/2018 | Suni | .................. | G01C 21/3638 |

OTHER PUBLICATIONS

You Tube video https://www.youtube.com/watch?v=7xgZJWVkbsQ; iTech: "How to remotely control your PC from your Mobile Anytime From Anywhere", 2 pages.

* cited by examiner

COMPUTER-IMPLEMENTED METHOD FOR CONTROLLING A REMOTE DEVICE WITH A LOCAL DEVICE

BACKGROUND OF THE INVENTION

Field of the Invention

The present invention relates to the control of a remote electronic device, for example a hand-held tablet-computer, with a local electronic device, for example a smartphone. The invention is particularly useful if the remote device has a larger screen than the local device.

Description of the Prior Art

During the last decade, a significant increase in the number of mobile devices such as smartphones and hand-held tablets has been observed around the world. There is also a growing interest in using mobile devices to control other electronic devices, for example electrical systems in homes, medical appliances, robots or gaming consoles.

Several existing products, such as TeamViewer®, allow users to remotely control a remote device from a local device. After the user has installed a program on both devices, the user can remotely control, for example, his desktop or tablet computer at home from his smartphone and access the files, pictures, applications and programs stored on the computer from the mobile device. Usually, the screen of the local device displays a complete or partial copy of the content that is displayed on the screen of the remote device. This gives the user the feeling as if he was looking at the screen of the remote device.

Simultaneously, inputs on the local device are interpreted as being destined for the remote device. In this remote mode, the commands corresponding to the user inputs are transmitted to the remote device via a communication channel. On the remote device, these commands are executed as if they had been input at the remote device. It is also possible to provide somebody else, for example an IT specialist, with an access to one's own device for repair or maintenance work on the software running on that device.

Some products of this kind provide the option to (temporarily) switch to a local mode. In this local mode, all or certain user inputs are interpreted to be destined for the local device, although the communication channel to the remote device is established. This implies that commands corresponding to these inputs are not transmitted to the remote device, but are executed on the local device. For example, a user may wish to change certain settings of his local device, or to reboot the local device, but not the remote device. This can be done only in the local mode, because in the remote mode such commands would be executed by the remote device. Switching from the remote mode to the local mode, and back from the local mode to the remote mode, usually requires a specific user input, for example pushing a soft button that is produced by the program and overlays the screen content of the local device.

If the screen of the local device is smaller than the screen of the remote device, it is necessary to display on the local device a scaled down copy of the screen content of the remote device. Only then the user can visually capture the entire content of the remote screen instantly. However, decreasing the image size is possible only within certain limits. A large reduction of the image size entails that text and other features may become too small to be legible.

Furthermore, in the case of a local device having a touch-sensitive screen, it may become difficult for a user to hit the links or soft buttons with his fingertip or a pen. Under such circumstances, the user often magnifies the screen content of the local device. To this end, the user has to switch to the local mode, because it is not desired to magnify the content of the remote screen, but its copy on the local screen.

Although a magnification of the screen content of the remote screen also leads to an increased feature size on the screen of the local device, the result is not the same. For example, if a map is displayed on the remote device, an increased magnification of the remote screen content usually implies that the map is displayed with an increased scale. In many maps, the size of texts and similar map features remains the same, but additional features are added.

Similar considerations also apply to scroll movements. For example, scrolling over a map on the local device entails that the user can visually capture the entire map shown on the remote screen successively. If the map is scrolled directly on the remote screen, this implies that certain parts of the map cannot be displayed on the local device any more, while new parts of the map are added.

After the user switches to the local mode, it is usually necessary to manually switch back to the remote mode in which all user inputs are transmitted to the remote device again.

After a magnification of the local screen content, the entire screen content of the remote device cannot be displayed on the local device any more. Then the user must scroll the screen content for being able to visually capture the entire content of the remote screen successively. If the local device has a touch-sensitive screen, scrolling is usually controlled by a pan gesture of a fingertip or a pen. But if such scroll commands shall be executed on the local screen and not on the remote screen, the user must again switch from the remote to the local mode. This requires an additional user input.

Therefore, in situations in which the local screen is smaller than the remote screen, the user interface becomes complicated, because the user must frequently switch between the local mode and the remote mode.

SUMMARY OF THE INVENTION

It is an object of the present invention to provide a computer-implemented method for a simpler control of a remote device with a local device, particularly in cases in which the screen of the local device is smaller than the screen of the remote device. In particular, less contribution from the user shall be necessary if the user wishes to change the magnification of the screen content of the local device or to scroll this screen content.

In accordance with the present invention, this object is achieved by a computer-implemented method comprising the following steps:

a) a remote device having a first screen is provided;
b) a local device having a second screen is provided;
c) at least a part of a content of the first screen is displayed on the second screen with a magnification m;
d) the local device records a user-action performed on the local device;
e) if the value of the magnification m is greater than a threshold value M, the local device interprets the user-action as a command destined for itself and executes the command locally;
f) if the value of the magnification m is equal to or smaller than the threshold value M, the local device interprets the user-action as a command destined for the remote device and transmits the command to the remote device for execution on the remote device.

The invention is based on the perception that under certain conditions the local device can switch automatically, i.e. without receiving an additional user input, between the remote mode and the local mode. In the usual remote mode, substantially all user-actions are interpreted as commands destined for the remote device, while in the local mode, certain user-actions, and in particular user-actions that correspond to scroll commands or commands to change the magnification, are interpreted as commands destined for the local device and not for the remote device. According to the invention, this automatic switching between the local mode and the remote mode occurs if the current magnification m, which is usually selected and changed by the user for the local screen, becomes larger or smaller, respectively, than a predetermined threshold value M. This reflects the fact that there is a need to magnify or scroll the local screen content only if the magnification m is large. If the magnification is sufficiently small (usually <1), the user does not need to magnify or scroll the screen content of the local device, because the user can visually capture all or most of the content of the remote screen anyway.

The threshold value M may be fixed, but it is preferred to compute the threshold value in the local device as a function of the physical sizes of the local screen and the remote screen. In addition, if the resolutions of the screens significantly differ, the threshold value M may also depend on the screen resolutions. It is also envisaged to offer the user to set the threshold value M. For example, the user may set the threshold value M with a view to the user's personal visual capability.

The term "magnification" denotes in this context the ratio between the physical size (i.e. the size measured in millimeters, not in pixels) of a feature shown on the first (remote) screen and the size of the same feature shown on the second (local) screen. If the magnification is greater than 1, the size of the feature on the second screen is larger than the size of the same feature on the first screen. If the magnification is smaller than 1, the features are demagnified and therefore smaller than displayed on the first (remote) screen. The magnification m is therefore a positive real number. Typically, the magnification can be set freely by the user between a lower limit $M_{min}$ and an upper limit $M_{max}$. These limits are usually set by a program that is installed on the local device and enables, together with a similar program installed on the remote device, the control of the remote device by the local device.

Although the benefits associated with the invention are most evident if the local screen is smaller than the remote screen, there are also other cases in which the invention is advantageous. For example, similar situations occur if the screen of the local device is larger than the screen of the remote device, but the contents of two or more remote screens shall be simultaneously displayed on the local screen. Then the area that is available on the local screen for displaying the content of each remote screen may be smaller than the area of at least one remote screen.

If the user-action corresponds to a command to change the magnification m, and if the current magnification m is greater than the threshold value M, this command will thus be interpreted by the local device as being destined for itself. Then only the magnification of the content of the second (local) screen is changed, while the content of the first (remote) screen remains stationary. If the current magnification is equal to or smaller than the threshold value M, the same command will be interpreted by the local device as being destined for the remote device. As mentioned further above, this also modifies the content shown on the second (local) screen, but generally the result is different from a mere magnification performed for the second screen.

The same applies if the user-action corresponds to a scroll command. If the magnification m is greater than the threshold value M, the scroll command will be interpreted by the local device as being destined for itself. Then only the content of the second (local) screen is scrolled, while the content of the first (remote) screen remains stationary. If the current magnification is equal to or smaller than the threshold value M, the scroll command is executed on the remote device, only.

If the second screen is a touch-sensitive screen, the user-action may be a touch gesture. The local device then automatically decides whether a pan or fingertip gesture, for example, is destined for the local device or the remote device depending on the magnification m. In voice controlled devices, the user-action may consist of certain spoken commands. For example, a command such as "Scroll-up!" may be interpreted differently by the local device depending on the current magnification m.

Also in the local mode, the local device may transmit all commands—with the exception of a command to change the magnification m and a scroll command—to the remote device irrespective of the magnification m. Then the automatic switching between the local mode and the remote mode is performed only if changes of the magnification and scroll commands are involved, while all other commands are transmitted immediately to the remote device. The "local mode" might then be considered as a mixed mode rather than the conventional local mode, because most commands are directly transmitted to the remote device.

However, it is also possible to define additional commands that shall be interpreted differently depending on the magnification m. For example, it may be envisioned to rotate a screen content either on the local screen or on the remote screen depending on the current magnification m.

Usually the first screen and the second screen have shapes that are at least substantially rectangular so that the first screen and the second screen each have a first side and a second side that is arranged perpendicular to the first side. Then the threshold value M may be determined such that in a first range of magnifications m with $M_{min} \leq m \leq M$, the content of the first screen is completely displayed on the second screen. In a second range of magnifications m with $M < m \leq M_1$, only the content of the first screen extending along the first side of the first screen is completely displayed on the second screen, while the content of the first screen extending along the second side of the first screen is not completely displayed on the second screen. In a third range of magnifications m with $M_1 < m < M_{max}$, neither the content of the first screen extending along the first side nor the content of the first screen extending along the second side is completely displayed on the second screen.

A threshold value M determined in this manner is particularly advantageous, because if the content of the first screen is completely displayed on the second screen, there is usually no need to change the magnification for the local device or to scroll the content on the second (local) screen.

The parameter $M_1$ is thus defined as the maximum magnification at which only the content of the first screen extending along one side of the first screen is completely displayed on the second screen.

If the value of the magnification m is in the first range of magnifications, the local device may interpret a user-action, which corresponds to a command to increase the magnification m, as a command destined for itself, and increase the magnification on the second screen. A user-action, which corresponds to a scroll command, may be interpreted by the local device as a command destined for the remote device.

A magnification m in the first range of magnifications implies that the content of the first screen is completely displayed on the second (local) screen. If the second screen is smaller than the first screen, this requires a threshold value M<1, i.e. a demagnified copy of the first screen is displayed on the second screen. If then a user performs a user-action which corresponds to a command to increase the magnification m, it can be reasonably assumed that only the magnification on the second screen shall be increased and not on the first screen of the remote device. This is different for a user-action which corresponds to a scroll command, because if the content of the first screen is already completely displayed on the second screen, there is usually no need to scroll a content of the second screen. Therefore scroll commands are immediately transmitted to the remote device for execution there.

On the other hand, if the value of the magnification m is in the first range of magnifications, the local device may interpret a user-action, which corresponds to a command to decrease the magnification m, as a command destined for the remote device. This reflects the fact that a user usually has no interest to decrease the magnification m still further on its local device if the content of the first screen is already completely displayed on the second screen.

If the value of the magnification m is in the second range of magnifications, this implies that only the content of the first screen extending along a first side of the first screen is completely displayed on the second screen, and consequently the entire content of the first screen is not completely displayed on the second screen. Then the local device may interpret a user-action, which corresponds to a command to change the magnification m, as a command destined for itself, and changes the magnification on the second screen. The local device may interpret a user-action, which corresponds to a command to scroll the content displayed on the second screen along a direction parallel to its first side, as a command destined for itself, and may scroll the content on the second screen along its first side accordingly. However, the local device may interpret a user-action, which corresponds to a command to scroll the content displayed on the second screen along a direction parallel to its second side, as a command destined for the remote device. In other words, scroll commands are handled differently by the local device, as in one direction the content of the first screen is completely displayed on the second screen, while in the other direction this is not the case. This reflects the fact that if the content of the first screen along one direction is visible on the second screen, there is usually no need to scroll the second screen along this direction.

If the value of the magnification m is in the third range of magnifications, the local device may interpret a user-action, which corresponds to a command to change the magnification m, as a command destined for itself, and may change the magnification on the second screen. A user-action, which corresponds to a scroll command, may be interpreted by the local device as a command destined for itself. The local device then scrolls the content of the second screen accordingly. In other words, if even the content of the first screen extending along the first side of the first screen is not completely displayed on the second screen, the content of the first screen does not fit along any direction into the second screen, and therefore all commands to change the magnification and to scroll should be interpreted as destined for the local device.

If the value of the magnification m is equal to $M_{max}$, the local device may interpret a user-action, which corresponds to a command to decrease the magnification m, as a command destined for itself. A user-action, which corresponds to a command to increase the magnification m, may be interpreted as a command destined for the remote device. As the magnification m selected on the local device cannot be increased beyond the maximum value $M_{max}$, it is reasonable to interpret any user-action which corresponds to a command to further increase the magnification as a command destined for the remote device, while a command to decrease the magnification m should be executed locally on the second screen.

Subject of the invention is also a data processing system comprising a remote device having a first screen, a local device having a second screen and means for carrying out the following steps:
a) at least a part of a content of the first screen is displayed on the second screen with a magnification m;
b) the local device records a user-action performed on the local device;
c) if the value of the magnification m is greater than a threshold value M, the local device interprets the user-action as a command destined for itself and executes the command;
d) if the value of the magnification m is equal to or smaller than the threshold value M, the local device interprets the user-action as a command destined for the remote device and transmits the command to the remote device for execution on the remote device.

Subject of the invention is also a computer program comprising instructions which, when the program is executed by a local device, cause the local device to carry out the following steps:
displaying at least a part of a content of a first screen of a remote device on a second screen of the local device with a magnification m;
the local device records a user-action performed on the local device;
if the value of the magnification m is greater than a threshold value M, the local device interprets the user-action as a command destined for itself and executes the command;
if the value of the magnification m is equal to or smaller than the threshold value M, the local device interprets the user-action as a command destined for the remote device and transmits the command to the remote device for execution on the remote device.

Subject of the invention is also a non-transitory or transitory computer-readable medium, comprising instructions stored thereon, that when executed on a processor of the local device, perform the steps of:
displaying at least a part of a content of a first screen of a remote device on a second screen of the local device with a magnification m;
the local device records a user-action performed on the local device;
if the value of the magnification m is greater than a threshold value M, the local device interprets the user-action as a command destined for itself and executes the command;
if the value of the magnification m is equal to or smaller than the threshold value M, the local device interprets the user-action as a command destined for the remote device and transmits the command to the remote device for execution on the remote device.

A transitory computer-readable medium may be a random-access memory (RAM), while non-transitory computer-readable mediums comprise hard disc drives of a server or other computer, optical discs, read-only memories or flash memories.

DEFINITIONS

The term "device" is used herein to denote an electronic device having a processing unit and a user interface. Examples of such devices include servers, desktop or portable computers, PDAs, television sets, gaming consoles and various mobile devices such as smartphones or tablet computers.

The term "screen" as used herein includes any type of cathode ray tube or liquid crystal display, but also projection screens or screen in VR headsets.

The term "user-action" is used herein to denote any type of action that a user may perform to control an electronic device. Such user-actions include
  moving a mouse,
  hitting the key of a mouse, of a keyboard or of any other peripheral input device,
  gestures on a touch-sensitive screen,
  speaking,
  gestures made with any part of the human body, e.g. gestures made with the arms, the head, the eyelids or the iris.

The term "scrolling" is used herein to denote sliding text, images or video across a monitor or display screen, either vertically or horizontally.

BRIEF DESCRIPTION OF THE DRAWINGS

Various features and advantages of the present invention may be more readily understood with reference to the following detailed description taken in conjunction with the accompanying drawings in which.

DETAILED DESCRIPTION OF PREFERRED EMBODIMENTS

1. Introduction

Figure 1:
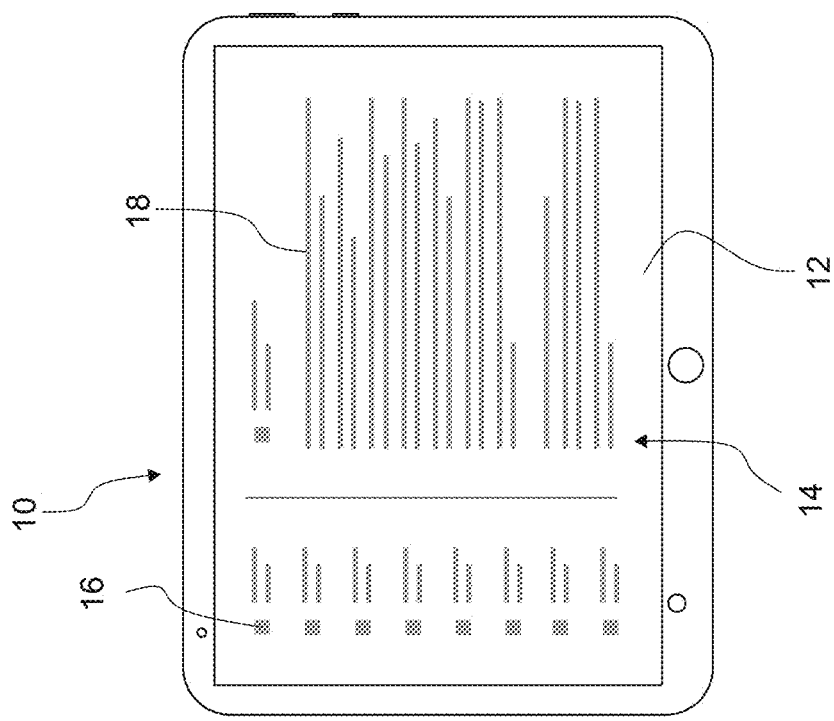
FIG. 1 shows a tablet computer that is controlled remotely from a smartphone, wherein the content shown on the screen of the tablet computer is completely displayed on the screen of the smartphone which is used in the portrait orientation.
Figure 1:
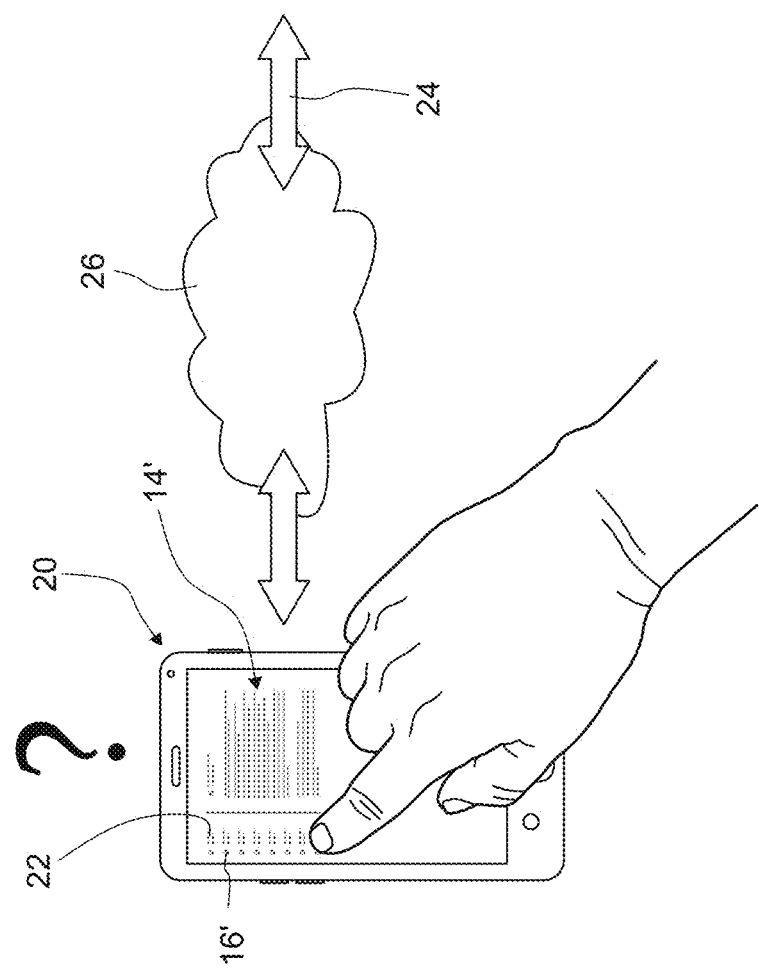

FIG. 1 shows on the right hand side a tablet computer 10 having a touch-sensitive screen 12 on which a content 14 is displayed. The content 14 exemplarily comprises several lines of text 18 and soft buttons 16 which, when touched by a fingertip or a pen, trigger certain actions, for example opening a web link. As a matter of course, the content 14 may also comprise graphics such as photographs or maps.

On the left hand side of FIG. 1 a smartphone 20 is shown which also has a touch-sensitive screen 22. Apart from the touch-sensitive screens, the tablet computer 10 and the smartphone 20 each comprises a processing unit, a non-transitory memory and a rechargeable battery (not shown).

On the tablet computer 10 and also on the smartphone 20 a program is installed and stored in the respective memory that enables the tablet computer 10 to be controlled remotely from the smartphone 20. To this end, a server typically assigns a unique ID to both devices. If a user enters the ID on the smartphone 20, the server establishes an encrypted communication channel 24 between the two devices 10, 20 via a network 26. After this communication channel has been established, the server typically withdraws his participation so that the devices 10, 20 communicate directly with one another.

A copy of the content 14 displayed on the screen 12 of the tablet computer 10 is now also displayed on the screen 22 of the smartphone 20. The smartphone 20 interprets basically all user inputs made on its touch-sensitive screen 22 as commands destined for the tablet computer 10. These commands are transmitted via the communication channel 24 to the tablet computer 10, which executes the commands as if they had been input directly on the tablet computer 10.

The physical size of the screen 22 of the smartphone 20 is usually much smaller than the size of the screen 12 of the tablet computer 10. In this context the physical size does not refer to the resolution, but to the physical dimension measured in cm². Since the screen 22, which is in the following referred to as "local screen," is smaller than the screen 12, which is in the following referred to as "remote screen," the content 14 on the remote screen 12 cannot be completely displayed on the local screen 22 without demagnification. The term "demagnification" means that a magnification m<1 has been selected by the user.

This situation is shown in FIG. 1. It can be seen that the content 14 displayed on the remote screen 12 is displayed as content 14' on the local screen 22 with a significant demagnification. Although the resolution of the local screen 22 is high, text 18 and other features of the content 14' may be too small to be legible. Furthermore, the soft buttons 16' on local screen 22 may be arranged so densely that it is difficult for a user to touch the desired soft button with a touch gesture. Therefore, in a situation as shown in FIG. 1, it may be difficult for a user to control the tablet computer 10 from his smartphone 20.

Figure 2A:
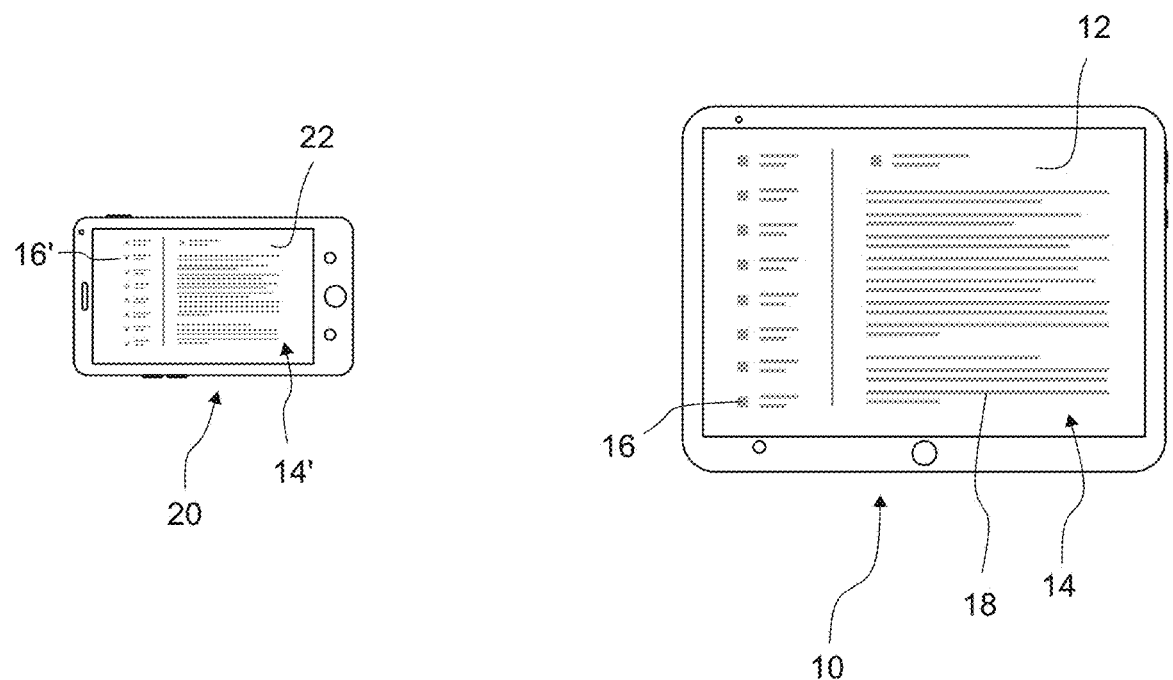
FIG. 2a shows the tablet computer and the smartphone from FIG. 1, wherein the smartphone is used in the landscape orientation so that the entire screen content of the tablet computer is displayed on the smartphone.

Experienced users know that they can improve this situation by rotating the smartphone 20 by 90°, as this is shown in FIG. 2a. Both devices 10, 20 are now in the same orientation (here landscape). Although the aspect ratios of the screens 12, 22 are usually different, the content 14 of the remote screen 12 now fits much better onto the local screen 22 of the smartphone 20. As a result, a smaller demagnification is necessary, and text and other features may now be legible.

2. Magnification dependent mode switching

This is the point where the program installed on the smartphone 20 comes into play. The program recognizes that the user has selected a magnification m which is smaller than a threshold value M. This threshold value M is determined by the program such that, if the magnification m equals M, the content 14 of the remote screen 12 can be just completely displayed on the local screen 22. If the magnification m becomes greater than M, only a portion of the screen content would be displayed on the local screen 22.

a) First Range of Magnifications

If $M_{min} \leq m \leq M$, with $M_{min}$ being the minimum magnification that is possible on the local screen 22, the smartphone 20 automatically changes into the remote mode in which almost all gestures performed on the touch-sensitive local screen 22 are interpreted as destined for the remote screen 12. The commands corresponding to these gestures are then transmitted via the communication channel 24 to the tablet computer 10 and are executed there.

Figure 2B:
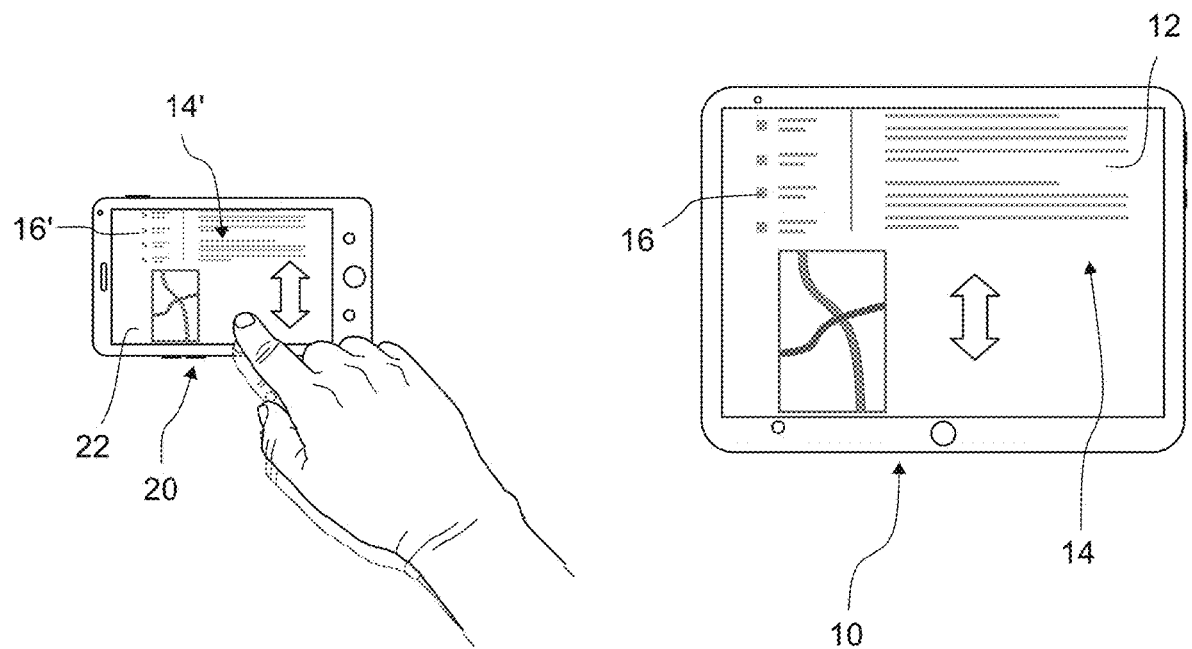
FIG. 2b illustrates how a vertical scroll command on the smartphone shown in FIG. 2a is executed on the tablet computer.
Figure 2C:
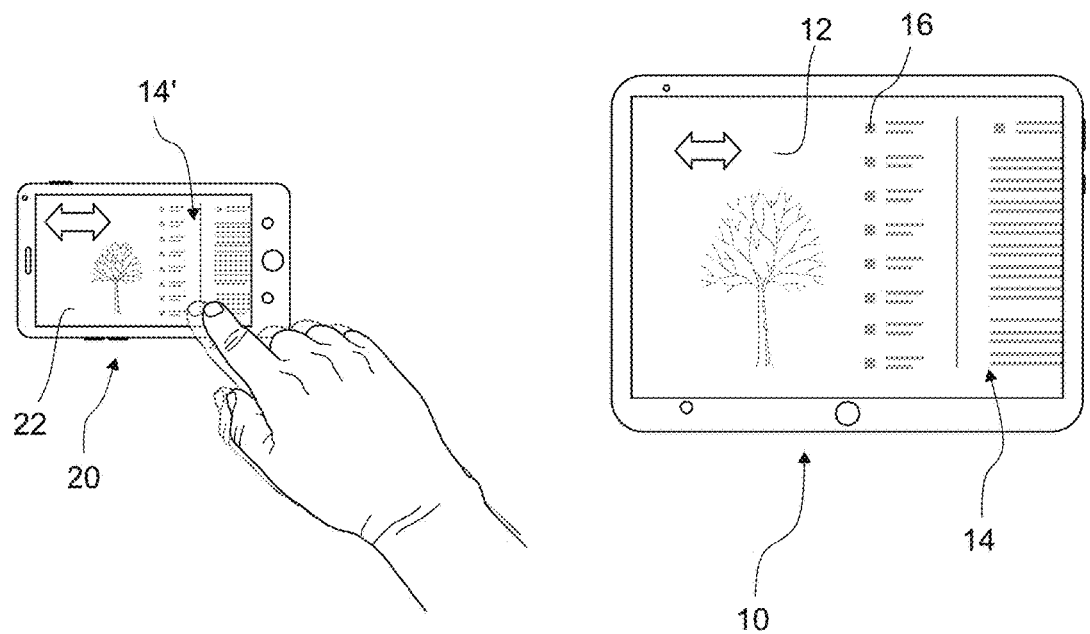
FIG. 2c illustrates how a horizontal scroll command on the smartphone shown in FIG. 2a is executed on the tablet computer.

For example, if a user performs a pan gesture as shown in FIG. 2b in order to scroll the content 14' displayed on the local screen 22 vertically, this command is transmitted to the tablet computer 10 which performs the scroll movement. Similarly, a gesture to the right as shown in FIG. 2c is interpreted by the smartphone 20 as a command destined for the tablet computer 10, and consequently the content 14 on the remote screen 12 is scrolled horizontally.

Also a gesture which corresponds to a command to decrease the magnification m will be interpreted by the smartphone 20 as a command destined for the tablet computer 10. This is because there is usually no need to decrease the magnification m if the content 14 of the remote screen 12 is already completely displayed on the local screen 22.

Figure 2D:
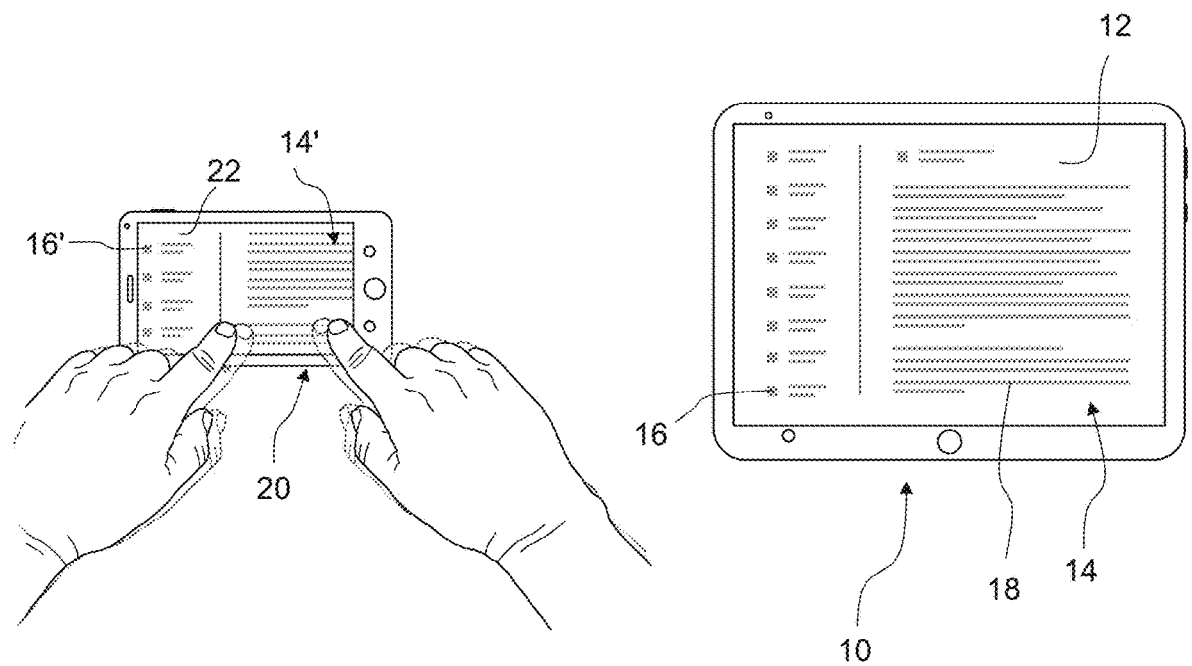
FIG. 2d illustrates how a command to increase the magnification on the smartphone shown in FIG. 2a is only is executed on the smartphone.

The only exception may be a command to increase the magnification m. If the user wants to increase the magnification m, this usually involves a two-finger gesture on the touch-sensitive screen 22. This command may not be interpreted by the program as being destined for the tablet computer 10, but only for the smartphone 20. Thus the magnification command is executed only on the smartphone 20, but not on the tablet computer 10. FIG. 2d exemplarily illustrates how the content 14' on the local screen 22 is now displayed so that it has approximately the same scale as the content 14 shown on the remote screen 12. The content 14 on the remote screen 12 is not affected by this command.

All other commands, for example commands to enact a certain link that has been touched by the user, are transmitted to the remote device 10 and are executed there.

b) Second Range of Magnifications

Figure 3A:
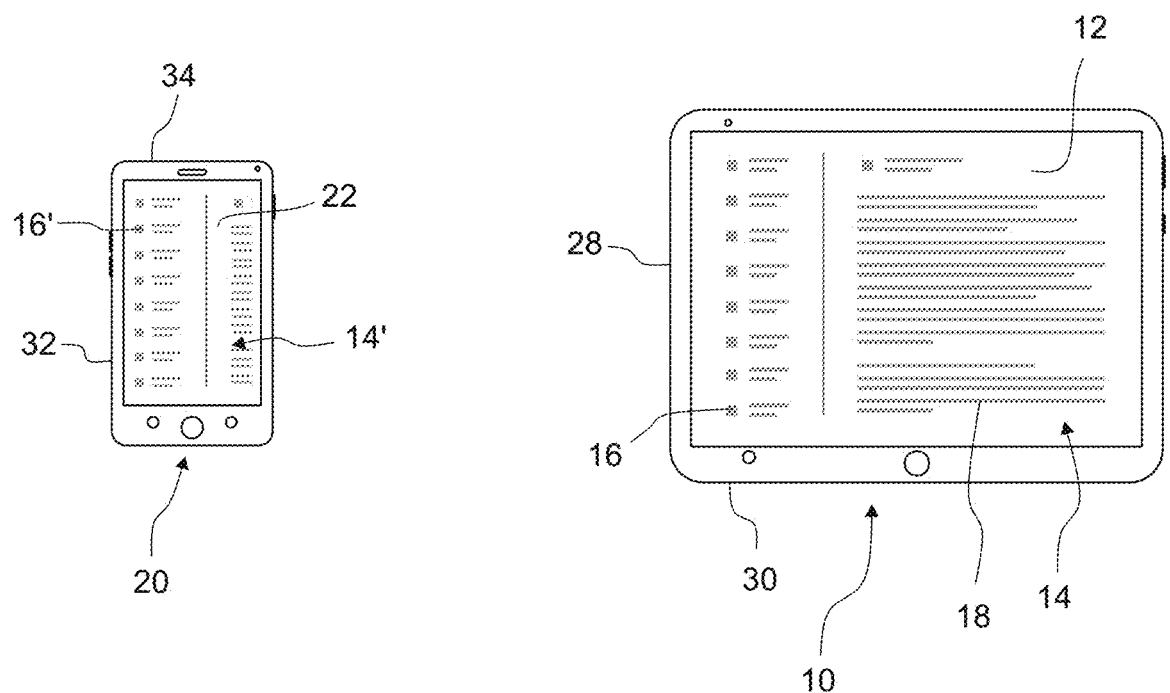
FIG. 3a shows the tablet computer and the smartphone from FIG. 1, wherein only the screen content of the tablet computer along its short side is completely displayed on the smartphone.

FIG. 3a shows a situation in which the user has set the magnification m so that it is in a second range of magnifications in which the condition $M < m \leq M_1$ holds. $M_1$ is a parameter that is defined as the maximum magnification at which only the content of the remote screen 12 extending along its short side 28 is completely displayed on the local screen 22. This parameter $M_1$ is determined by the software on the basis of the size and proportions of the screens 12, 22.

Thus, with magnifications in the second range of modifications, only the content 14 of the remote screen 12 extending along its short side 28 is completely displayed on the local screen 22, while the content extending along the long side 30 of the remote screen 12 is only partially displayed on the local screen 22. Therefore, in the exemplary situation shown in FIG. 3a, the eight soft buttons 16 aligned along the short side 28 of the remote screen 12 are completely displayed on the screen 22 of the smartphone 20, but most of the text 18 of the content 14 is clipped and therefore not visible.

Figure 3B:
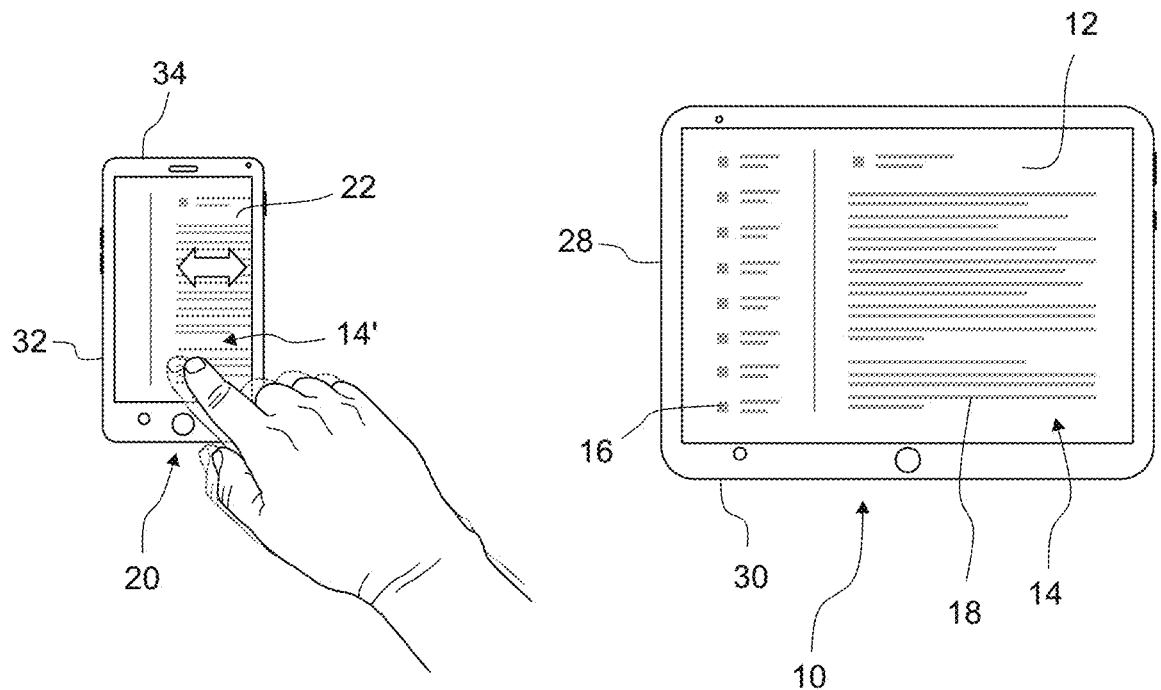
FIG. 3b illustrates how a horizontal scroll command on the smartphone shown in FIG. 3a is only executed on the smartphone.

In such a situation the smartphone 20 switches to a mixed mode in which a part of the scroll commands initiated by touch gestures are transmitted to the tablet computer 10, while other scroll commands are executed only on the smartphone 20. More specifically, a pan gesture for scrolling the content 14' on the local screen 22 horizontally, i.e. along its short side 34, is executed only on the smartphone 20, as this is shown in FIG. 3b. In this manner a user is able to display the portion of the content 14' (in particular the text 18) that has not been visible before. If horizontal scrolling is not possible any more, because the content 14' shown on the local screen 22 has reached a vertical edge of the content 14 shown on the remote screen 12, a command to further scroll along the horizontal direction may be interpreted by the smartphone 22 as a command destined for the tablet computer 10. Then the content 14 on the first screen 12 is scrolled horizontally.

Figure 3C:
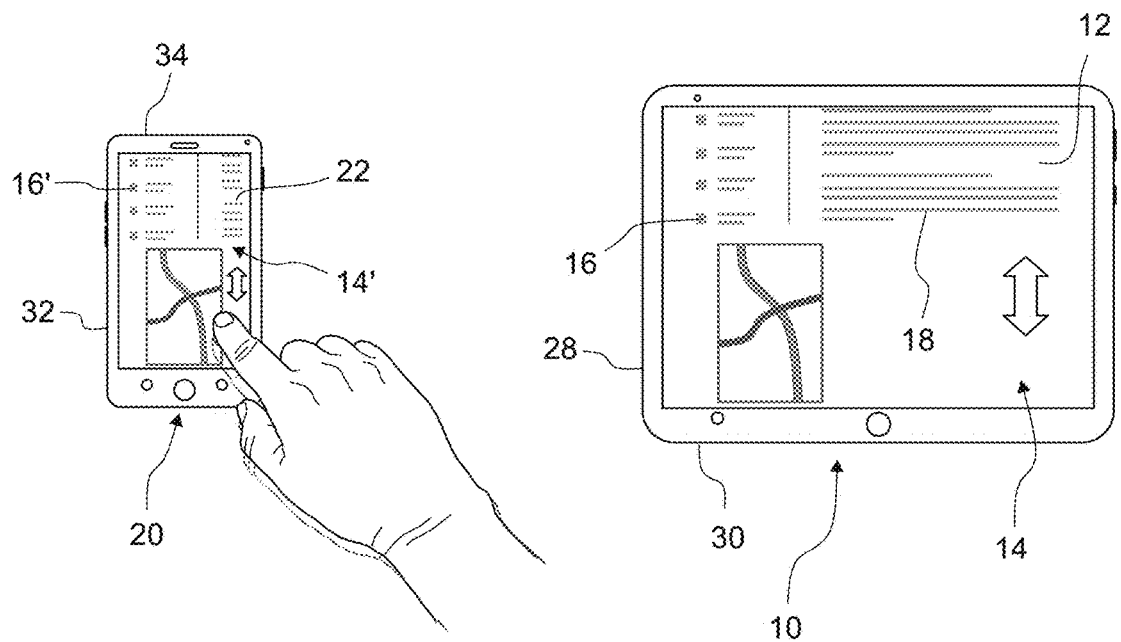
FIG. 3c illustrates how a vertical scroll command on the smartphone shown in FIG. 3a is executed on the tablet computer.

However, a command to scroll the content 14' displayed on the local screen 22 vertically, i.e. along its long side 32, is interpreted by the smartphone 20 as a command destined for the tablet computer 10. Consequently, the content 14 is scrolled vertically on the remote screen 12, as this is shown in FIG. 3c.

Figure 3D:
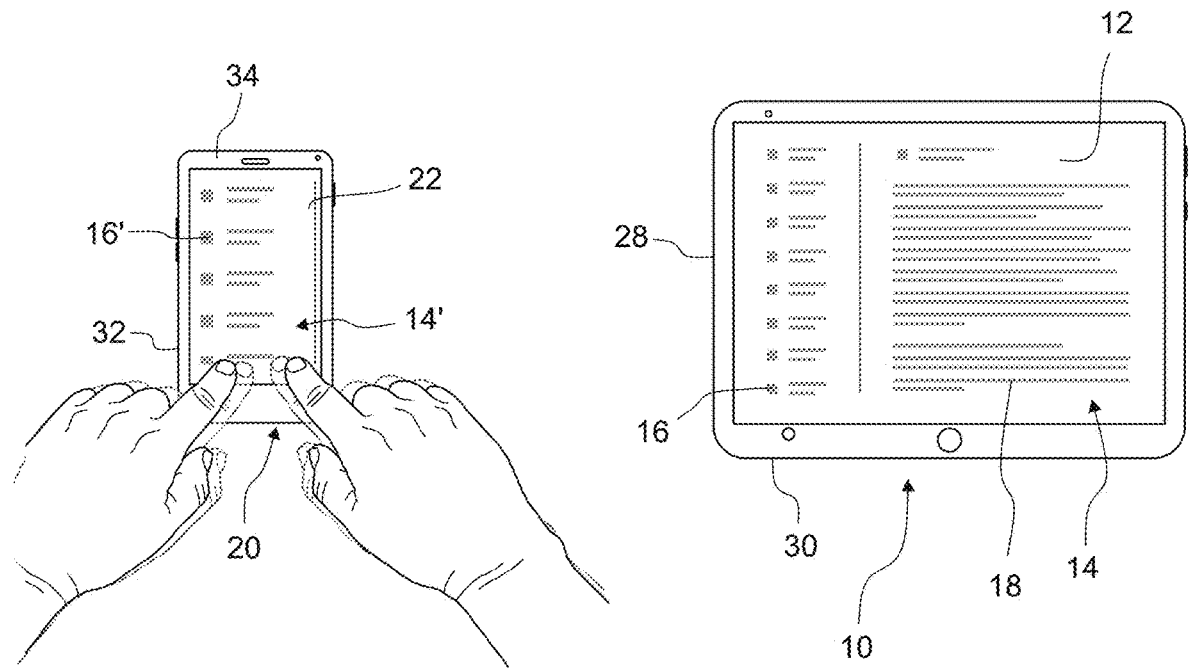
FIG. 3d illustrates how a command to increase the magnification on the smartphone shown in FIG. 3a is only is executed on the smartphone.

Similar to the situation shown in FIG. 2d, a touch gesture corresponding to a command to change the magnification is interpreted by the smartphone 20 as a command destined for itself. Therefore only the content 14' on the local screen 22 is magnified, while the content 14 on the remote screen 12 is not affected, as this is shown in FIG. 3d.

Also with a magnification m in the second range of magnifications, all other commands, for example commands to enact a certain link that has been touched by the user, are transmitted to the remote device 10 and are executed there.

c) Third Range of Magnifications

Figure 4A:
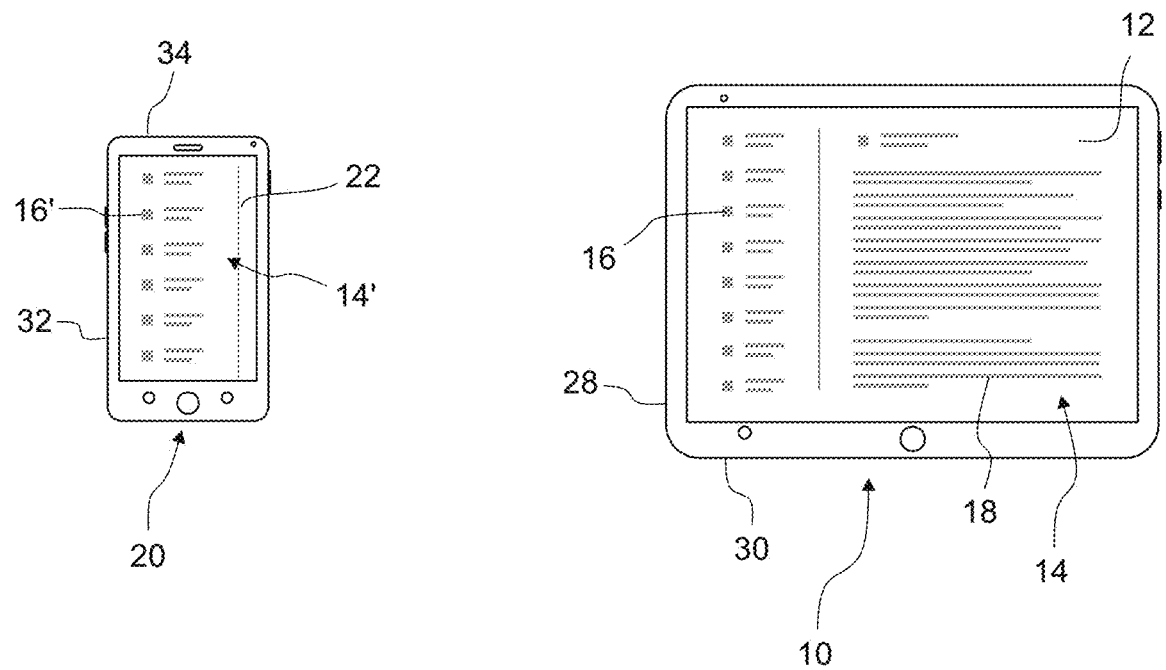
FIG. 4a shows the tablet computer and the smartphone from FIG. 1, wherein the screen content of the table computer along neither side is completely displayed on the smartphone.
Figure 4B:
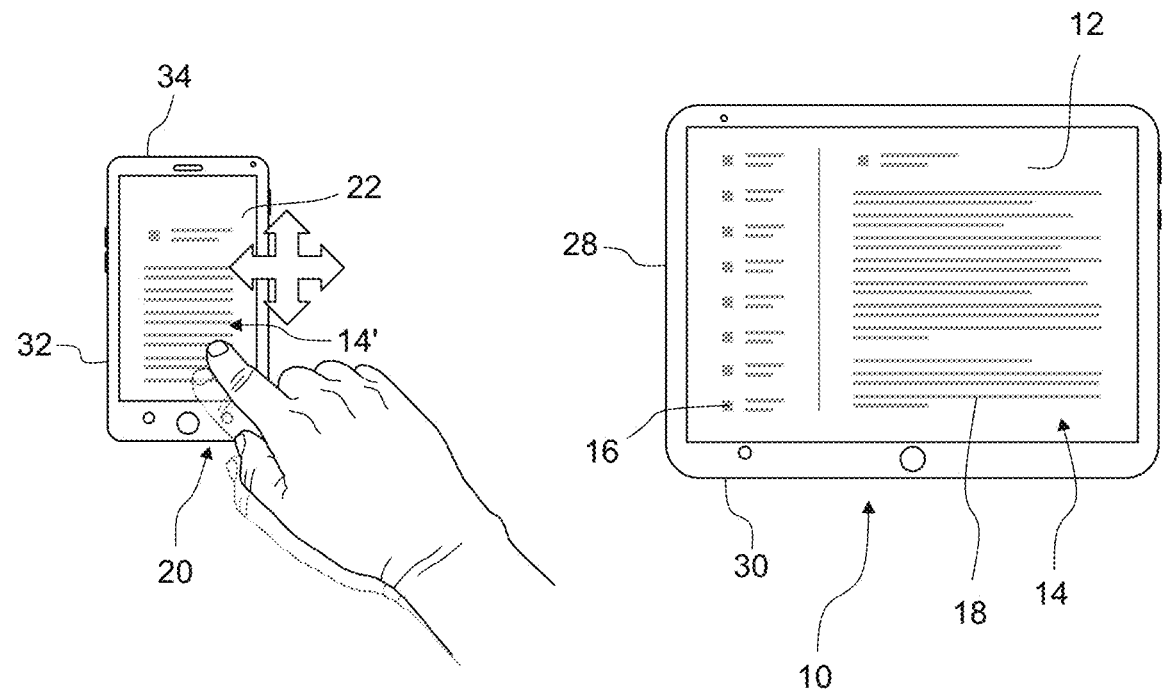
FIG. 4b illustrates how a scroll command on the smartphone shown in FIG. 4a is only executed on the smartphone.

FIG. 4a shows a situation in which the magnification m has been set by the user so that it is in the third range of magnifications in which the condition $M_1 < m \leq M_{max}$ holds. Then even the content 14 of the remote screen 12 extending along its short side 28 is not completely displayed on the local screen 22. In FIG. 4a, only six of the eight soft buttons 16 are exemplarily shown on the local screen 22. In such a situation, all scroll commands are interpreted by the smartphone 20 as commands destined for itself. Consequently, only the content 14' of the local screen 22 is scrolled, but not the content 14 of the remote screen 12, as this is shown in FIG. 4b. If scrolling along a specific direction is not possible any more, because the content 14' shown on the local screen 22 has reached an edge of the content 14 shown on the remote screen 12, a command to further scroll along this direction may be interpreted by the smartphone 22 as a command destined for the tablet computer 10. Then the content 14 on the first screen 12 is scrolled along this direction.

Figure 4C:
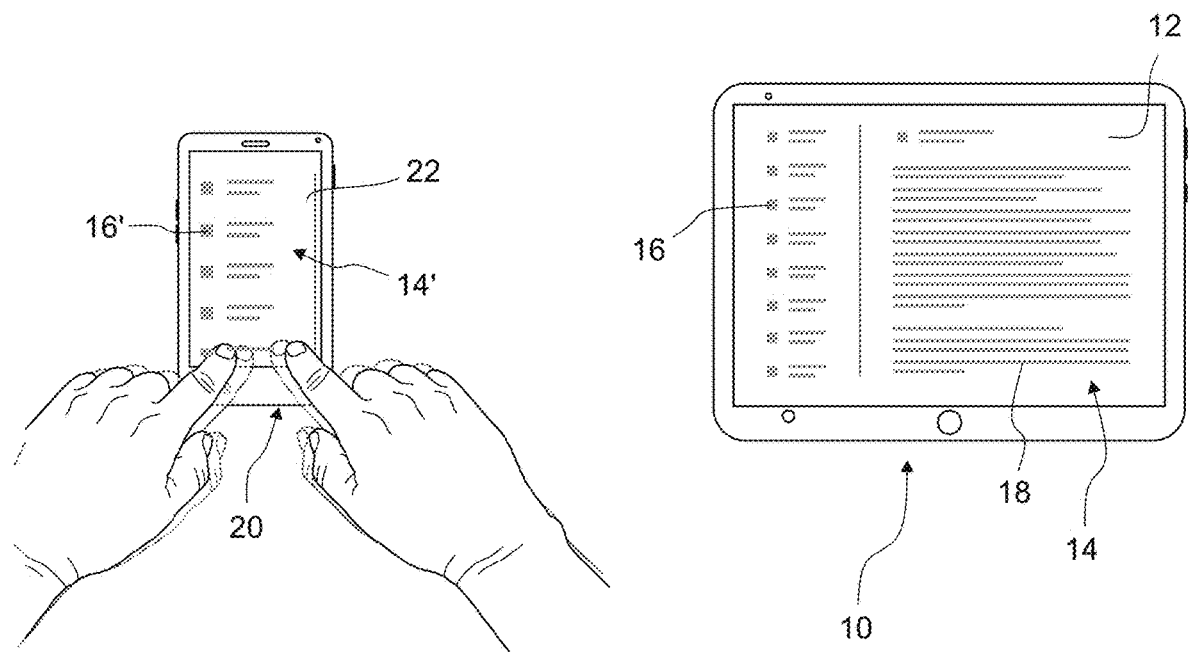
FIG. 4c illustrates how a command to increase the magnification on the smartphone shown in FIG. 4a is only executed on the smartphone.

Also a user gesture initiating a command to change the magnification m is interpreted by the smartphone 20 as a command destined for itself. As shown in FIG. 4c, the magnification m is only changed on the local screen 22, while the content 14 of the remote screen 12 is not affected.

Figure 4D:
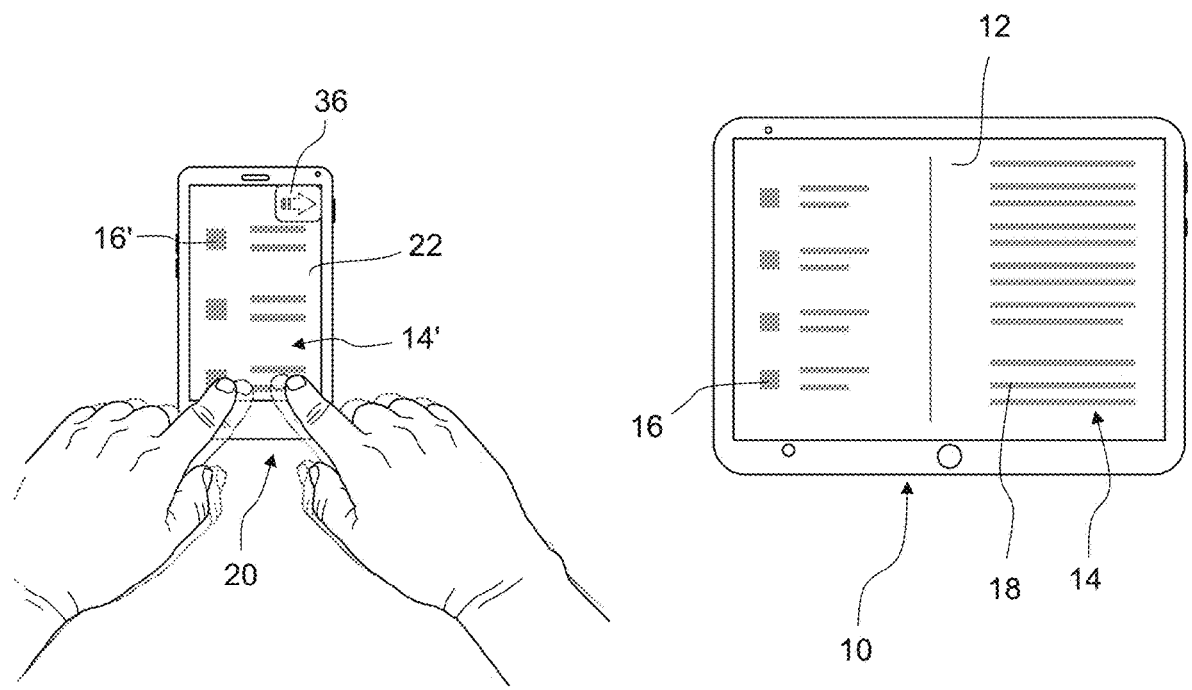
FIG. 4d illustrates a soft button that can be used to manually switch to the remote mode.

FIG. 4d illustrates a situation in which the magnification m has been set to its maximum value $M_{max}$. Since the magnification m cannot be increased any further, a user gesture corresponding to a command to further increase the magnification m is interpreted by the smartphone 20 as a command destined for the tablet computer 10. Consequently, the content 14 of the remote screen 12 is magnified.

However, a user gesture corresponding to a command to decrease the magnification m, is interpreted by the smartphone 20 as a command destined for itself. Thus the magnification m is decreased only on the local screen 22, while the remote screen 12 is not affected.

In the embodiment shown, the program installed on the smartphone 20 overlays a soft button 36 on the local screen 22. By touching the soft button 36, the user is able to manually switch from the mixed mode to the remote mode in which all his gestures are interpreted by the smartphone to be destined by the tablet computer 10. For example, if the user touches the soft button 36 and then performs a gesture corresponding to a command to decrease the magnification m, this command is then interpreted by the smartphone 20 as being destined not for itself as described above, but as being destined for the tablet computer 10. Then the magnification is only decreased on the remote screen 12.

The soft button 36, which may be present all the time or only in certain situations, allows the user to suppress the automatic switching between the mixed mode and the remote mode. By touching the soft button 36, switching between the different modes is not performed automatically by the program, but is subject to the disposition of the user so that the user is able to select the mode that the user considers to be most suitable for the current situation. For example, some applications like Google Maps® require pan gestures for performing certain functions. Then the user must be able to instruct the smartphone 10 that his pan gesture is not meant to be interpreted as a command to scroll the content 14' on the local screen 22, but as a command for the application running on tablet computer 10.

Incidentally, also with a magnification m in the third range of magnifications, all other commands, for example commands to enact a certain link that has been touched by the user, are transmitted to the remote device 10 and are executed there.

3. Important Method Steps

Figure 5:
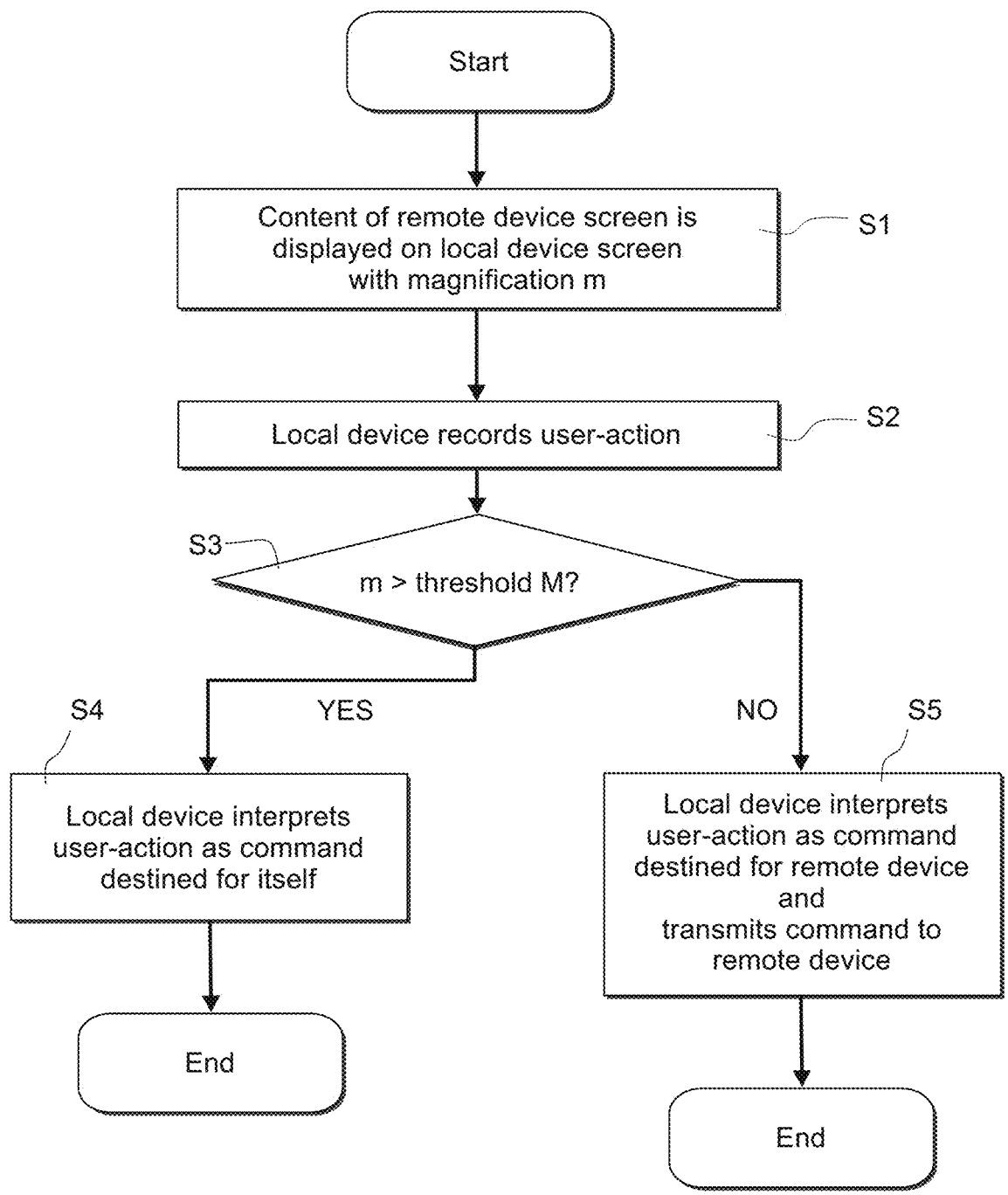
FIG. 5 is a flow diagram that illustrates important method steps in accordance with the present invention.

FIG. 5 is a flow diagram that illustrates important steps of the method according to the invention.

In a first step S1, content of a remote device screen, such as screen 12 in the embodiment described above, is displayed on a local device screen, such as screen 22 in the embodiment described above, with a magnification m.

In a second step S2 the local device records a user-action such as a pan gesture.

In a third step S3 the local device decides whether the current magnification is greater than a threshold value M. If this is the case, the local device interprets the user-action as command destined for itself. Otherwise it interprets the command as destined for the remote device and transmits the command to the remote device.

The invention claimed is:

1. A computer-implemented method for controlling a remote device with a local device, the method comprising the following steps:
   (a) a remote device having a first screen is provided, wherein commands destined for the remote device are transmitted for execution;
   (b) a local device having a second screen is provided;
   (c) at least a part of a content of the first screen is displayed on the second screen with a magnification m, wherein the first screen and the second screen have shapes that are at least substantially rectangular so that the first screen and the second screen each have a first side and a second side that is arranged perpendicular to the first side, and wherein
      in a first range of magnifications m with $M_{min} \leq m \leq M$, the content of the first screen is completely displayed on the second screen,
      in a second range of magnifications m with $M < m \leq M_1$, only the content of the first screen extending along the first side of the first screen is completely displayed on the second screen, while the content of the first screen extending along the second side of the first screen is not completely displayed on the second screen,
      in a third range of magnifications m with $M_1 < m \leq M_{max}$, neither the content of the first screen extending along the first side nor the content of the first screen extending along the second side is completely displayed on the second screen;
   (d) the local device records a user-action performed on the local device;
   (e) when the value of the magnification m is in the first range of magnifications, the local device then interprets the user-action, when it corresponds to a scroll command, as a command destined for the remote device;
   (f) when the value of the magnification m is in the second range of magnifications, the local device then interprets
      the user-action, when it corresponds to a command to scroll the content displayed on the second screen along a direction parallel to its first side, as a command destined for itself, and scrolls the content on the second screen along its first side, and/or
      the user-action, when it corresponds to a command to scroll the content displayed on the second screen along a direction parallel to its second side, as a command destined for the remote device.

2. The method of claim 1, wherein the second screen is a touch-sensitive screen, and the user-action is a touch gesture.

3. The method of claim 1, wherein the local device transmits all commands with the exception of a command to change the magnification m and a scroll command to the remote device irrespective of the magnification m.

4. The method of claim 1, wherein, when the value of the magnification m is in the first range of magnifications, the local device then interprets
   the user-action, when it corresponds to a command to increase the magnification m, as a command destined for itself, and increases the magnification on the second screen; and/or
   the user-action, when it corresponds to a command to decrease the magnification m, as a command destined for the remote device.

5. The method of claim 1, wherein, when the value of the magnification m is in the second range of magnifications, the local device then interprets the user-action, when it corresponds to a command to change the magnification m, as a command destined for itself, and changes the magnification on the second screen.

6. The method of claim 1, wherein, when the value of the magnification m is in the third range of magnifications, the local device interprets the user-action, when it corresponds to a command to change the magnification m, as a command destined for itself, and changes the magnification on the second screen, and/or the user-action, when it corresponds to a scroll command, as a command destined for itself, and scrolls the content of the second screen accordingly.

7. The method of claim 1, wherein, when the value of the magnification m is equal to $M_{max}$, the local device then interprets the user-action, when it corresponds to a command to decrease the magnification m, as a command destined for itself, and/or the user-action, when it corresponds to a command to increase the magnification m, as a command destined for the remote device.

8. The method of claim 1, wherein the first side of the second screen is shorter than the second side of the second screen.

* * * * *